(12) United States Patent
Motoki et al.

(10) Patent No.: US 9,171,671 B2
(45) Date of Patent: Oct. 27, 2015

(54) LAMINATE TYPE ELECTRONIC COMPONENT AND MANUFACTURING METHOD THEREFOR

(75) Inventors: Akihiro Motoki, Nagaokakyo (JP); Makoto Ogawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 344 days.

(21) Appl. No.: 13/315,311

(22) Filed: Dec. 9, 2011

(65) Prior Publication Data
US 2012/0161576 A1    Jun. 28, 2012

(30) Foreign Application Priority Data

Dec. 24, 2010    (JP) .................. 2010-287038

(51) Int. Cl.
| | |
|---|---|
| *H01G 4/30* | (2006.01) |
| *H01G 4/06* | (2006.01) |
| *H01G 4/12* | (2006.01) |
| *H01G 4/005* | (2006.01) |
| *H01G 4/008* | (2006.01) |
| *H01G 4/228* | (2006.01) |
| *H01G 11/34* | (2013.01) |

(52) U.S. Cl.
CPC ............. *H01G 4/12* (2013.01); *H01G 4/005* (2013.01); *H01G 4/008* (2013.01); *H01G 4/228* (2013.01); *H01G 4/30* (2013.01); *H01G 11/34* (2013.01); *Y02E 60/13* (2013.01)

(58) Field of Classification Search
CPC ........ H01G 4/30; H01G 4/232; H01G 4/1227
USPC .......................................... 361/306.3, 321.2
See application file for complete search history.

(56) References Cited

U.S. PATENT DOCUMENTS

| 6,310,757 B1 | 10/2001 | Tuzuki et al. |
| 6,960,366 B2 | 11/2005 | Ritter et al. |
| 6,972,942 B2 | 12/2005 | Ritter et al. |

(Continued)

FOREIGN PATENT DOCUMENTS

| CN | 1282084 A | 1/2001 |
| JP | 63-104314 A | 5/1988 |
| JP | 2000-336486 A | 12/2000 |

OTHER PUBLICATIONS

Motoki et al., "Multilayer Electronic Device and Method for Manufacturing the Same", U.S. Appl. No. 12/109,371, filed Apr. 25, 2008.

*Primary Examiner* — David M Sinclair
*Assistant Examiner* — Arun Ramaswamy
(74) *Attorney, Agent, or Firm* — Keating & Bennett, LLP

(57) ABSTRACT

In a method of manufacturing a laminate type electronic component, while the distance between adjacent exposed ends of a plurality of internal electrodes is adjusted preferably to be about 50 μm or less, a plurality of conductive particles composed of Pd, Pt, Cu, Au, or Ag are provided on the surface of a component main body. The conductive particles have an average particle size of about 0.1 nm to about 100 nm, which are distributed in island-shaped configurations over the entire surface of the component main body, while the average distance between the respective conductive particles is adjusted to fall within the range of about 10 nm to about 100 nm. The component main body is subjected to electrolytic plating such that plating growth develops in and around a region including the respective exposed ends of the plurality of internal electrodes.

2 Claims, 2 Drawing Sheets

(56) References Cited

U.S. PATENT DOCUMENTS

| | | |
|---|---|---|
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 2002/0187895 A1 | 12/2002 | Izaki et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2008/0225462 A1* | 9/2008 | Motoki et al. ............ 361/306.3 |

* cited by examiner

LAMINATE TYPE ELECTRONIC COMPONENT AND MANUFACTURING METHOD THEREFOR

BACKGROUND OF THE INVENTION

1. Field of the Invention

The present invention relates to a laminate type electronic component and a method for manufacturing the laminate type electronic component, and more particularly, relates to a laminate type electronic component with an external electrode formed directly by plating in such a way that the external electrode is at least partially connected electrically to a plurality of internal electrodes, and a method for manufacturing the laminate type electronic component.

2. Description of the Related Art

Laminate type electronic components typified by laminated ceramic capacitors are, in general, provided with a component main body which has a stacked structure including, for example, a plurality of stacked functional material layers composed of a dielectric ceramic, and a plurality of layered internal electrodes formed along the interfaces between the functional material layers. The respective ends of the plurality of internal electrodes are exposed at each of two end surfaces of the component main body, and external electrodes are formed so as to electrically connect the respective ends of the internal electrodes to each other.

For the formation of the external electrodes, typically, a conductive paste including a metal constituent and a glass constituent is applied onto the end surfaces of the component main body, and then subjected to firing, thereby forming paste electrode layers first. The paste electrode layers serve to electrically connect the internal electrodes to each other. Next, a first plating layer containing, for example, nickel as its main constituent is formed on the paste electrode layers, and a second plating layer containing, for example, tin or gold as its main constituent is further formed thereon. The second plating layer is intended to ensure solderability, whereas the first plating layer serves to prevent solder erosion in the case of a solder joint.

As described above, the external electrode is typically composed of the three-layer structure of the paste electrode layer, the first plating layer, and the second plating layer.

However, the paste electrode layer has a large thickness of several tens μm to several hundreds of μm. Therefore, in order to limit the dimensions of the laminate type electronic component up to certain specifications, there is undesirably a need to reduce the effective volume for ensuring a capacitance, because there is a need to ensure the volume for the paste electrode layers. On the other hand, the plating layers each have a thickness on the order of several μm. Thus, if the external electrodes can be composed only of plating layers, a larger effective volume can be ensured for ensuring the capacitance.

For example, Japanese Patent Application Laid-Open No. 63-104314 discloses a method in which a metal thin film formed by an electroless plating method is used as an external electrode. More specifically, Japanese Patent Application Laid-Open No. 63-104314 discloses a process of subjecting the entire surface of a component main body to an activation treatment, then carrying out electroless plating to form a metal thin film on the entire surface of the component main body, and then carrying out masking-etching to remove an unnecessary section of the metal thin film and using the left section thereof as external electrodes.

According to the method disclosed in Japanese Patent Application Laid-Open No. 63-104314, the metal thin film may be tentatively formed on the entire surface of the component main body, and thus, the process from the activation treatment to the electroless plating can be carried out by a batch treatment (for example, a barrel plating method) which can efficiently treat a large number of chips of component main bodies. Therefore, in this regard, the method disclosed in Japanese Patent Application Laid-Open No. 63-104314 can be considered advantageous in terms of productivity and cost.

On the other hand, in the method disclosed in Japanese Patent Application Laid-Open No. 63-104314, the metal thin film is formed on the entire surface of the component main body as a result of the electroless plating, and thus, it is then necessary to remove an unnecessary section of the metal thin film. However, it is not possible to adopt the batch treatment simply in the masking-etching process to remove a specific section of the metal thin film. More specifically, this is because there is a need for steps such as aligning and retaining component main bodies to be subjected to masking-etching, and providing an etching resist to specific sections of the aligned and retained component main bodies, which are not able to be handled by the batch treatment. Accordingly, after all, the method disclosed in Japanese Patent Application Laid-Open No. 63-104314 will not be able to enjoy the advantages of the batch treatment, such as the ability to efficiently treat a large number of chips of component main bodies.

SUMMARY OF THE INVENTION

Preferred embodiments of the present invention provide a method for manufacturing a laminate type electronic component, which makes it possible to apply a batch treatment, and makes it possible to efficiently form a plating film to serve as an external electrode in a specific position.

Preferred embodiments of the present invention also provide a laminate type electronic component which can be manufactured by the manufacturing method described above.

A method for manufacturing a laminate type electronic component according to a preferred embodiment of the present invention includes a step of preparing a component main body of a stacked structure with a plurality of internal electrodes located therein and each partially exposed from the component main body; and an external electrode forming step of forming, on the component main body, an external electrode electrically connected to the internal electrodes, and preferably configured as follows in order to solve the technical problems described above.

First, the component main body is subject to the condition that the distance between the adjacent exposed ends of the plurality of internal electrodes is about 50 μm or less, for example.

In addition, the external electrode forming step includes an electrical conductivity imparting treatment step of providing a surface of the component main body with a plurality of conductive particles including at least one selected from Pd, Pt, Cu, Au, and Ag, and then an electrolytic plating step of subjecting the component main body to electrolytic plating to form a uniform plating film while growing plated depositions deposited on the respective exposed ends of the plurality of internal electrodes in the component main body. The plating film is supposed to serve as at least a portion of the external electrode.

The conductive particles provided in the electrical conductivity imparting treatment step have an average particle size preferably in the range of about 0.1 nm to about 100 nm, for example. Furthermore, in the electrical conductivity imparting treatment step, the conductive particles are arranged so as to be distributed in island-shaped configurations over the entire surface of the component main body, while the average distance between the respective conductive particles is preferably adjusted to fall within the range of about 10 nm to about 100 nm, for example.

It is to be noted that the particle sizes used for finding the average particle size of the conductive particles are not the particle sizes of strict primary particles, and in the case of aggregation of a plurality of particles, the average particle size is found from an image observed with the aggregate as one particle.

In the method for manufacturing a laminate type electronic component according to a preferred embodiment of the present invention, the electrical conductivity imparting treatment step is preferably carried out by using a batch treatment method in which the entire component main body is immersed in an electrical conductivity imparting treatment liquid, and the electrolytic plating step is preferably carried out by using a barrel plating method.

The conductive particles are preferably Pd particles, for example.

According to another preferred embodiment of the present invention, a laminate type electronic component includes a component main body of a stacked structure with a plurality of internal electrodes provided therein and each of the internal electrodes is partially exposed from the component main body; and an external electrode located on the component main body and electrically connected to the internal electrodes.

The laminate type electronic component according to a preferred embodiment of the present invention is characterized in that a distance between adjacent exposed ends of the plurality of internal electrodes is about 50 μm or less in the component main body, a plurality of conductive particles are provided on the surface of the component main body so as to be arranged in island-shaped configurations over the entire surface, while the average distance between the respective conductive particles is adjusted preferably to fall within the range of about 10 nm to about 100 nm, and the external electrode includes a plating film of plated depositions deposited on and in the vicinity of the respective exposed ends of the plurality of internal electrodes in the component main body.

In the present preferred embodiment of the present invention, the plating film preferably contains Cu as its main constituent, for example.

According to a preferred embodiment of the present invention, the conductive particles are preferably arranged in island-shaped configurations, and a discontinuous film of the conductive particles is thus formed over the entire surface of the component main body. While this discontinuous film is a halfway conductor film in a way, the combination of the discontinuous conductor film with electrolytic plating allows plating growth to be developed in the region with the respective exposed ends of the plurality of internal electrodes gathered at the surface of the component main body, and in the vicinity of the region, while plating growth is not allowed to be developed in the other region. Accordingly, even when a batch treatment such as barrel plating is carried out, a plating film can be formed only in a region where an external electrode is desired to be formed.

In addition, in a preferred embodiment of the present invention, electrolytic plating is applied to the formation of the plating film, and therefore it is easy to prevent damage caused by the plating solution to the laminated body, as compared with a case of electroless plating being used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
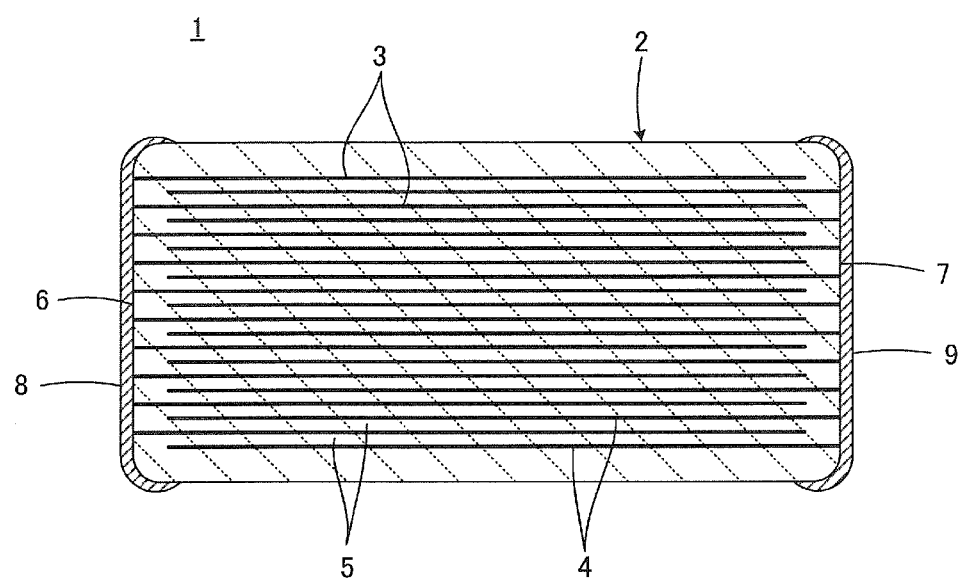
FIG. 1 is a cross-sectional view illustrating a laminate type electronic component manufactured by a manufacturing method according to a preferred embodiment of the present invention.
Figure 2:
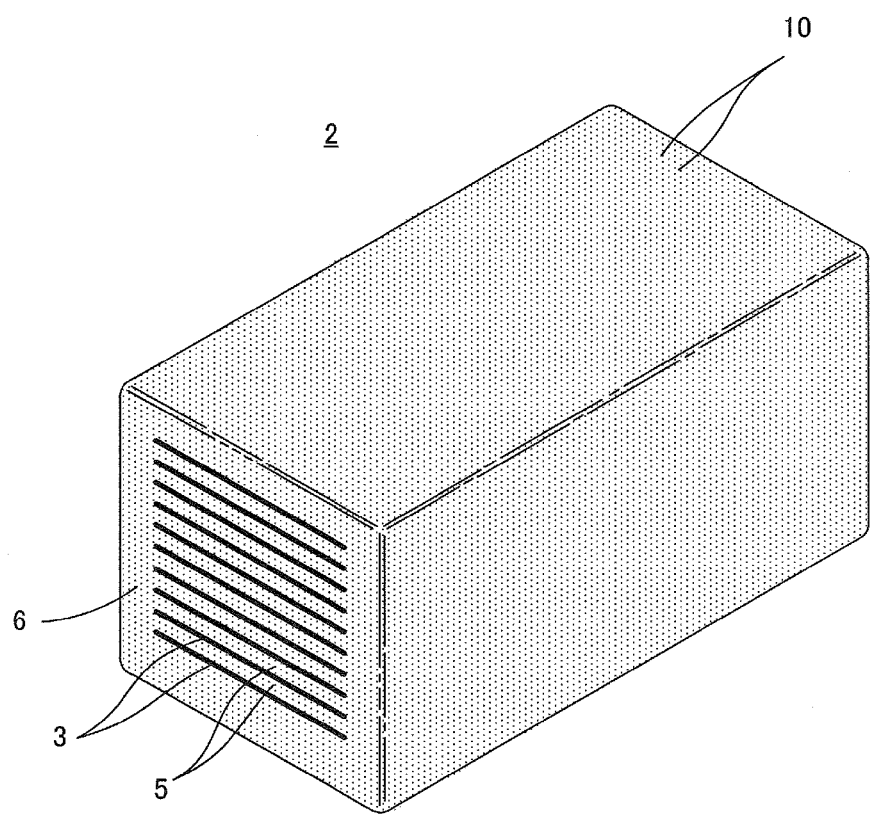
FIG. 2 is a perspective view illustrating the appearance of a component main body before forming external electrodes in the process of manufacturing the laminate type electronic component shown in FIG. 1.

With reference to FIGS. 1 and 2, a laminate type electronic component will be described to which various preferred embodiments of the present invention are applied.

A laminate type electronic component 1 includes a component main body 2 which preferably has a stacked structure. The component main body 2 includes a plurality of internal electrodes 3 and 4 provided therein. More specifically, the component main body 2 includes a plurality of functional material layers 5 stacked, and a plurality of layered internal electrodes 3 and 4 arranged along the interfaces between the functional material layers 5. The internal electrodes 3 and the internal electrodes 4 are arranged alternately in the stacking direction. The internal electrodes 3 and 4 contain, for example, nickel as their main constituent.

When the laminate type electronic component 1 constitutes a laminated ceramic capacitor, the functional material layers 5 are preferably composed of a dielectric ceramic. It is to be noted that the laminate type electronic component 1 may constitute other components such as an inductor, a thermistor, and a piezoelectric component. Therefore, depending on the function of the laminate type electronic component 1, the functional material layers 5 may be composed of, besides a dielectric ceramic, a magnetic ceramic, a semiconductor ceramic, a piezoelectric ceramic, etc., and further may be composed of a material other than ceramics.

The plurality of internal electrodes 3 and the plurality of internal electrodes 4 each include ends respectively exposed at one end surface 6 and the other end surface 7 of the component main body 2. The distance between the adjacent exposed ends of the internal electrodes 3 and the distance between the adjacent exposed ends of the internal electrodes 4 are both adjusted to preferably be about 50 μm or less, for example.

External electrodes 8 and 9 are formed respectively on the end surfaces 6 and 7 of the component main body 2 so that the respective ends of the internal electrodes 3 are electrically connected to each other and the respective ends of the internal electrodes 4 are electrically connected to each other. The external electrodes 8 and 9 preferably are respectively composed of plating films formed directly by electrolytic plating on the end surfaces 6 and 7 of the component main body 2. More specifically, the plating film constituting each of the external electrodes 8 and 9 is preferably formed by depositing metal ions in a plating solution on the respective exposed ends of the internal electrodes 3 and 4 in the component main body 2, and further growing the plated depositions that have been deposited and forming bridges between the respective adjacent exposed ends of the internal electrodes 3 and 4 to provide a uniform state.

As described above, the plating films formed directly on the end surfaces 6 and 7 of the component main body 2 preferably contain, for example, copper as their main constituent. This is because copper exhibits favorable electrical conductivity, and provides favorable throwing power in the case of a plating treatment, thus making it possible to improve the efficiency of the plating treatment, and increase the fixing strength of the external electrodes 8 and 9 with the component main body 2.

Although not shown in FIG. 1, the external electrodes 8 and 9 may further include a second plating film formed on the plating film, in order to improve the mountability of the laminate type electronic component 1 or to provide the mountability. The second plating film is preferably composed of, for example, a solder barrier layer of a plating layer containing nickel as its main constituent, and a solderability providing layer of a plating layer containing tin or gold as its main constituent, which is formed on the solder barrier layer to provide solderability.

It is to be noted that while the laminate type electronic component 1 shown in the drawing preferably is a two-terminal component provided with the two external electrodes 8 and 9, the present invention can be applied also to multi-terminal laminate type electronic components.

Next, a method for manufacturing the laminate type electronic component 1 shown in FIG. 1, in particular, a method for forming the external electrodes 8 and 9 will be described.

First, the component main body 2 is prepared as shown in FIG. 2 by a well known method. The plurality of internal electrodes 3 and 4 are each exposed respectively at the end surfaces 6 and 7 of the component main body 2. FIG. 2 illustrates a plurality of internal electrodes 3 exposed at one end surface 6.

Next, for forming the external electrodes 8 and 9 by electrolytic plating, an electrical conductivity imparting treatment step is first carried out to provide the surface of the component main body 2 with a plurality of conductive particles 10. As the conductive particles 10, for example, Pd particles are advantageously used. The electrical conductivity imparting treatment step is preferably carried out by using a batch treatment method in which each of the plurality of component main bodies 2 is entirely immersed in an electrical conductivity imparting treatment liquid. As the electrical conductivity imparting treatment liquid, for example, an activation treatment liquid is advantageously diverted, which liquid is used for pretreatment of electroless plating.

The conductive particles 10 provided on the surface of the component main body 2 preferably have an average particle size in the range of about 0.1 nm to about 100 nm, for example. In addition, in this electrical conductivity imparting treatment step, the conductive particles 10 are provided so as to be distributed in island-shaped configurations over the entire surface of the component main body 2, while the average distance between the respective conductive particles is adjusted preferably to fall within the range of about 10 nm to about 100 nm, for example.

It is to be noted that while the conductive particles are illustrated as a large number of spots in FIG. 2, the illustrated spots are merely intended to show the distribution of the conductive particles 10, but not to be considered to illustrate the particle seizes of or distance between the conductive particles.

Then, the component main body 2 is subjected to, for example, electrolytic copper plating. This electrolytic plating forms uniform plating films to serve as the external electrodes 8 and 9 while growing plated depositions deposited on the respective exposed ends of the plurality of internal electrodes 3 and 4 in the component main body 2.

In the electrolytic plating step described above, plating growth is developed in the region with the respective exposed ends of the plurality of internal electrodes 3 and 4 gathered at the surface of the component main body 2, and in the vicinity of the region, while no plating growth is developed in the other region. Therefore, the plating films to serve as the external electrodes 8 and 9 are formed only on the respective exposed ends of the plurality of internal electrodes 3 and 4 in the component main body 2, and on the vicinity of the ends.

As described above, in order to develop the plating growth selectively in the region with the respective exposed ends of the plurality of internal electrodes 3 and 4 gathered at the surface of the component main body 2, and in the vicinity of the region, it is important as described above that:

(1) the distance preferably is about 50 μm or less, for example, between the respective adjacent exposed ends of the plurality of internal electrodes 3 and 4;

(2) the conductive particles 10 preferably have an average particle size in the range of about 0.1 nm to about 100 nm, for example; and (3) the average distance between the respective conductive particles 10 preferably is within the range of about 10 nm to about 100 nm, for example.

For example, when the average particle size of the conductive particles 10 is less than about 0.1 nm outside the range of about 0.1 nm to about 100 nm, the function of promoting the plating growth will fail to be fulfilled sufficiently in the electrolytic plating step. On the other hand, when the average particle size is greater than about 100 nm, a continuous film is more likely to be produced, whereas the distribution of island-shaped configurations is less likely to be achieved, and as a result, anomalous deposition is likely to be caused such as plating growth developed even in an undesirable region in the electrolytic plating step.

In addition, when the average distance is less than about 10 nm between the respective conductive particles 10, plating growth may be developed also in the region other than the region and the vicinity of the respective exposed ends of the plurality of internal electrodes 3 and 4 gathered at the surface of the component main body 2.

Next, the component main body 2 with the plating films formed as described above is preferably subjected to a heat treatment. As the heat treatment temperature, a temperature of, for example, about 600° C. or more, preferably about 800° C. or more is adopted.

Next, if necessary, on the plating films, a second plating film is formed which is composed of, for example, a solder barrier layer of a plating layer containing nickel as its main constituent, and a solderability providing layer of a plating layer containing tin or gold as its main constituent, which is formed on the solder barrier layer to provide solderability, thereby completing the laminate type electronic component 1.

The external electrodes 8 and 9 shown in FIG. 1 are not only formed respectively on the end surfaces 6 and 7 of the component main body 2, but also formed so that respective end edges of the external electrodes 8 and 9 are located on the pair of principal surfaces and the pair of side surfaces, which are adjacent to the end surfaces 6 and 7. In order to allow this form of external electrodes 8 and 9 to be formed efficiently, although not shown, dummy conductors may be formed on the ends of the principal surfaces of the component main body 2, which are adjacent to the end surfaces 6 and 7, and/or in an outer layer section of the component main body 2. These dummy conductors make no substantial contribution to the development of electrical characteristics, but act to provide the deposition of metal ions for the formation of the plating films and to promote the plating growth.

In order to adequately expose the internal electrodes 3 and 4 at the end surfaces 6 and 7, it is preferable to apply a polishing treatment to the end surfaces 6 and 7 of the component main body 2 before the external electrode forming step described above. In this case, when the polishing treatment is carried out to such an extent that the respective exposed ends of the internal electrodes 3 and 4 protrude from the end surfaces 6 and 7, the respective exposed ends will expand in the planar direction, and the energy required for plating growth can be thus reduced.

An experimental example will be described below which was carried out to confirm the advantageous effects of various preferred embodiments of the present invention.

As a non-limiting example of a component main body of a laminate type electronic component, a component main body with a length of 0.94 mm, a width of 0.47 mm, and a height 0.47 mm for a laminated ceramic capacitor was prepared in which functional material layers were composed of a barium titanate-based dielectric ceramic, and internal electrodes contained Ni as their main constituent with a thickness of 0.6 μm. In this case, 7 types of component main bodies were prepared which were respectively 5 μm, 10 μm, 20 μm, 30 μm, 40 μm, 50 μm, and 60 μm in distance between adjacent exposed terminals of the plurality of internal electrodes in the component main body, as shown in the column "Distance between Exposed Ends of Internal Electrodes" of Table 1.

Next, an electrical conductivity imparting treatment was carried out for providing the entire surface of the component main body with a plurality of conductive particles. More specifically, 1000 component main bodies for each sample were put into a mesh container, and immersed entirely in a predetermined treatment liquid in accordance with a batch treatment. The electrical conductivity imparting treatment was carried out under any of the following conditions. The symbols shown in the column "Condition for Electrical Conductivity Imparting Treatment" of Table 1 correspond to the following symbols A1 to A5 of conditions for electrical conductivity imparting treatment.

A1. Implementation of "TMP Process" from Okuno Chemical Industries Co., Ltd. for use in Electroless Plating Pretreatment. The details of the process are as follows:
  1. Immersion in a sensitizer (100 ml/L) at a liquid temperature of 25° C. for 3 minutes;
  2. Washing with water twice by immersion in pure water (water temperature: 25° C.) for 1 minute;
  3. Immersion in an activator (50 ml/L) at a liquid temperature of 30° C. for 1 minute; and
  4. Washing with water twice by immersion in pure water (water temperature: 25° C.) for 1 minute.

A2. Implementation of "OPC Process" from Okuno Chemical Industries Co., Ltd. for use in Electroless Plating Pretreatment. The details of the process are as follows:
  1. Immersion in Pre-Dipping Agent (260 g/L of "OPC-SAL M") at a liquid temperature of 20° C. for 2 minutes;
  2. Immersion in Catalyst (OPC-80 Catalyst M: 45 ml/L, OPC-SAL M: 260 g/L) at a liquid temperature of 25° C. for 6 minutes;
  3. Washing with water twice by immersion in pure water (water temperature: 25° C.) for 1 minute;
  4. Immersion in Accelerator (OPC-500 Accelerator MX-1: 100 ml/L, OPC-500 Accelerator MX-2: 10 ml/L) at a liquid temperature of 30° C. for 5 minutes; and
  5. Washing with water twice by immersion in pure water (water temperature: 25° C.) for 1 minute.

A3. Implementation of the electroless plating pretreatment disclosed in Japanese Patent Application Laid-Open No. 2000-336486. The details of the process are as follows:
  1. [Sensitizing]—Immersion in a sensitizing solution including $SnCl_2 \cdot 2H_2O$: 15 g/L and HCl: 15 ml/L at a liquid temperature of 20° C. for 1 minute;
  2. [Washing with Pure Water]—Immersion in pure water (water temperature: 25° C.) for 15 seconds;
  3. [Catalyst Deposition]—Immersion in a silver salt activation solution (pH 7) containing $AgNO_3$: 1.5 g/L, $NiSO_4 \cdot 6H_2O$: 0.3 g/L, and $CoSO_4 \cdot 7H_2O$: 0.2 g/L at a liquid temperature of 20° C. for 1 minute;
  4. [Washing with Pure Water]—Immersion in pure water (water temperature: 25° C.) for 15 seconds <the repetition of the above steps 1 to 4 three times>;
  5. [Catalyst Deposition]—Immersion in a palladium activation solution (pH 1.5) containing $PdCl_2$: 1 g/L, HCl: 1 ml/L, $Pb(NO_3)_2$: 0.1 g/L, $Ag_2SO_4$: 0.03 g/L, and fluoroboric acid: 0.01 ml/L at a liquid temperature of 20° C. for 5 seconds; and
  6. [Washing with Pure Water]—Immersion in pure water (water temperature: 25° C.) for 15 seconds <the repetition of the above steps 5 and 6 twice>.

A4. Direct Plating Pretreatment: Implementation of "Neopact Process" from Atotech Deutschland GmbH. The details of the process are as follows:
  1. Immersion in a conditioner (Conditioner Neopact U: 50 ml/L, $Na_2CO_3$: 1.75 g/L, and $NaHCO_3$: 2.5 g/L) at a liquid temperature of 50° C. for 5 minutes;
  2. Immersion in pure water (water temperature: 25° C.) for 1 minute;
  3. Immersion in Pre-Dipping Agent (35% HCl: 0.5 ml/L; pH 7) at a liquid temperature of 25° C. for 1 minute;
  4. Immersion in a conductor (Basic Solution Neopact: 100 ml/L and Reducing Solution Neopact: 10 ml/L; adjusted to −240 to −280 mV on an electrometer) at a liquid temperature of 50° C. for 10 minutes;
  5. Immersion in pure water (water temperature: 25° C.) for 15 seconds;
  6. Immersion in Post-Dip (Post-Dip Neopact: 200 ml/L) at a liquid temperature of 25° C. for 2 minutes; and
  7. Immersion in pure water (water temperature: 25° C.) for 1 minute.

A5. No Implementation of Electrical Conductivity

In order to evaluate the states of the conductive particles provided by the electrical conductivity imparting treatment under the conditions A1 to A4 described above, glass substrates were separately subjected to the electrical conductivity imparting treatment under the same conditions, and observed under an AFM. The average particle sizes of the conductive particles, calculated from the observation results, were several to several tens nm under the condition A1, several tens to 100 nm under the condition A2, and 0.1 nm to several nm under the condition A3, and in each of these cases, discontinuous films were formed which were distributed like islands. In addition, under the condition A4, the excessively increased average particle size of the conductive particles caused formation of a conductive film of the conductive particles.

Next, into a 300 ml horizontal rotating barrel, 1000 component main bodies were input for each sample, and in addition, 100 ml of media of 0.7 mm in diameter were input. Then, either electrolytic Cu plating or electroless Cu plating was carried out while rotating the barrel at a peripheral velocity of 2.6 m/min. The respective conditions for the electrolytic Cu plating and electroless Cu plating were set as follows. The symbols shown in the column "Plating Condition" of Table 1 correspond to symbols B1 and B2 for the following plating conditions.

B1. Electrolytic Cu Plating

While using the following Cu plating bath, electrolytic Cu plating was carried out with current density×time set to a level of $0.10 \text{ A/dm}^2 \times 150$ minutes for providing a film thickness of 1 μm.

Electrolytic Cu Plating Bath
  Copper Pyrophosphate: 14 g/L
  Pyrophosphoric Acid: 120 g/L
  Potassium Oxalate: 10 g/L
  pH: 8.7
  Bath Temperature: 25° C.

B2. Electroless Cu Plating

While using the following Cu plating bath, electroless Cu plating was carried out with control for providing a film thickness of 1 μm.

Electroless Cu Plating Bath
  Copper Sulfate Pentahydrate: 10 g/L
  Formaldehyde: 5 g/L
  Potassium Sodium Tartrate Tetrahydrate: 30 g/L
  Polyethylene Glycol: 1 g/L
  Sodium Hydroxide: 5 g/L
  Bath Temperature: 40° C.
  Aeration: 0.5 L/min The laminated ceramic capacitors thus obtained for each sample were evaluated for the continuity of the Cu plating film and the presence or absence of anomalous deposition.

The continuity of the Cu plating film was determined as a defect, when the observation by an optical microscope found the area ratio of an exposed portion covered with no plating film to be about 5% or more at the end surfaces of the component main body. Then, the mark "x" was put in the column "Continuity Evaluation" of Table 1 when one or more samples were determined as defective(s) among 100 samples drawn, or the mark "O" was put therein when no defective was caused.

As for anomalous deposition of the Cu plating film, the sample was determined as a defect when the observation by an optical microscope found Cu plating deposited in a region of the component main body other than the region with the external electrodes formed. Then, the mark "x" was put in the column "Evaluation for Presence or Absence of Anomalous Deposition" of Table 1 when one or more samples were determined as defective(s) among 100 samples drawn, or the mark "O" was put therein when no defective was caused.

As a result of the electrical conductivity imparting treatment described above, it was in the case of "A1", "A2", and "A3" for the "Condition for Electrical Conductivity Imparting Treatment" that the provided conductive particles were distributed like islands with the average particle size thereof falling within the range of about 0.1 nm to about 100 nm.

In the case of samples 1 to 3 satisfying any of "A1", "A2", and "A3" for the "Condition for Electrical Conductivity Imparting Treatment", the "Continuity Evaluation" was determined as "O", whereas the "Evaluation for Presence or Absence of Anomalous Deposition" was also determined as "O" in the range of about 5 μm to about 50 μm for the "Distance between Exposed Ends of Internal Electrodes", when the "Plating Condition" was the electrolytic plating "B1".

In the case of sample 4, the "Condition for Electrical Conductivity Imparting Treatment" was "A5", more specifically, the electrolytic plating under the "Plating Condition" of "B1" was carried out without carrying out the electrical conductivity imparting treatment. Thus, only when the "Distance between Exposed Ends of Internal Electrodes" was a short distance of about 20 μm or less, the "Continuity Evaluation" was determined as "O", whereas the "Evaluation for Presence or Absence of Anomalous Deposition" was also determined as "O".

In the case of samples 5 to 7 and 9, the electroless plating was carried out under the "Plating Condition" of "B2". Thus, under any of "A1", "A2", "A3", and "A4" for the "Condition for Electrical Conductivity Imparting Treatment", the "Continuity Evaluation" was determined as "O", whereas the "Evaluation for Presence or Absence of Anomalous Deposition" was determined as "x" in the range of about 5 μm to about 60 μm for the "Distance between Exposed Ends of Internal Electrodes".

In the case of sample 8, the "Condition for Electrical Conductivity Imparting Treatment" was "A4", and as described previously, the excessively increased average particle size of the conductive particles caused formation of a continuous film of the conductive particles. Thus, when the electrolytic plating was carried out under the "Plating Condition" of "B1", the "Continuity Evaluation" was determined as "O", whereas the "Evaluation for Presence or Absence of Anomalous Deposition" was determined as "x" in the range of about 5 μm to about 60 μm for the "Distance between Exposed Ends of Internal Electrodes".

While preferred embodiments of the present invention have been described above, it is to be understood that variations and modifications will be apparent to those skilled in the art without departing from the scope and spirit of the present invention. The scope of the present invention, therefore, is to be determined solely by the following claims.

TABLE 1

| Sample Number | Condition for Electrical Conductivity Imparting Treatment | Plating Condition | Continuity Evaluation Distance between Exposed Ends of Internal Electrodes [μm] | | | | | | | Evaluation for Presence or Absence of Anomalous Deposition |
|---|---|---|---|---|---|---|---|---|---|---|
| | | | 5 | 10 | 20 | 30 | 40 | 50 | 60 | |
| 1 | A1 | B1 | O | O | O | O | O | O | X | O |
| 2 | A2 | B1 | O | O | O | O | O | O | X | O |
| 3 | A3 | B1 | O | O | O | O | O | O | X | O |
| 4 | A5 | B1 | O | O | O | X | X | X | X | O |
| 5 | A1 | B2 | O | O | O | O | O | O | O | X |
| 6 | A2 | B2 | O | O | O | O | O | O | O | X |
| 7 | A3 | B2 | O | O | O | O | O | O | O | X |
| 8 | A4 | B1 | O | O | O | O | O | O | O | X |
| 9 | A4 | B2 | O | O | O | O | O | O | O | X |

What is claimed is:

1. A laminate type electronic component comprising:
a component main body of a stacked structure and including a plurality of internal electrodes provided therein, each of the plurality of internal electrodes being partially exposed from the component main body; and
an external electrode located on the component main body and electrically connected to the internal electrodes; wherein
a distance between adjacent exposed ends of the plurality of internal electrodes is about 50 μm or less in the component main body;
a plurality of conductive particles are provided on all outer surfaces of the component main body so as to be distributed in island-shaped configurations over all of the outer surfaces of the component main body, and an average distance between the respective conductive particles is adjusted to fall within the range of about 100 nm to about 100 nm; and
the external electrode includes a plating film including plated depositions deposited on and in a vicinity of the respective exposed ends of the plurality of internal electrodes in the component main body.

2. The laminate type electronic component according to claim 1, wherein the plating film contains Cu as its main constituent.

* * * * *